US008521505B2

(12) United States Patent  
Arning et al.

(10) Patent No.: US 8,521,505 B2  
(45) Date of Patent: *Aug. 27, 2013

(54) STRING PATTERN CONCEPTUALIZATION FROM DETECTION OF RELATED CONCEPTS BY ANALYZING SUBSTRINGS WITH COMMON PREFIXES AND SUFFIXES

(75) Inventors: Andreas Arning, Tuebingen (DE); Roland Seiffert, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,212

(22) Filed: Aug. 24, 2012

(65) Prior Publication Data

US 2012/0317100 A1    Dec. 13, 2012

Related U.S. Application Data

(63) Continuation of application No. 12/347,070, filed on Dec. 31, 2008, now Pat. No. 8,311,795.

(30) Foreign Application Priority Data

Jan. 11, 2008    (EP) ..................................... 08100346

(51) Int. Cl.
*G06F 17/20* (2006.01)
*G06F 17/27* (2006.01)
*G06F 7/00* (2006.01)

(52) U.S. Cl.
USPC .................................... 704/1; 704/9; 707/711

(58) Field of Classification Search
USPC ............................. 704/1, 9, 10; 707/706, 711
See application file for complete search history.

(56) References Cited

U.S. PATENT DOCUMENTS

| 4,342,085 | A | 7/1982 | Glickman et al. |
| 6,338,057 | B1 | 1/2002 | Weeks |
| 6,804,677 | B2 | 10/2004 | Shadmon et al. |
| 7,249,121 | B1 | 7/2007 | Bharat et al. |
| 7,627,567 | B2 | 12/2009 | Ganti et al. |
| 7,761,286 | B1 | 7/2010 | Lawler |
| 2005/0278324 | A1 | 12/2005 | Fan et al. |
| 2006/0059153 | A1 | 3/2006 | Lassalle |

OTHER PUBLICATIONS

United States Patent and Trademark Office, Office Action for U.S. Appl. No. 12/347,070, Dec. 2, 2011, pp. 1-18, Alexandria, VA, USA.
United States Patent and Trademark Office, Notice of Allowance for U.S. Appl. No. 12/347,070, Jun. 14, 2012, pp. 1-16, Alexandria, VA, USA.
Stefan Kurtz & Chris Schleiermacher, REPuter: Fast Computation Of Maximal Repeats In Complete Genomes, Journal, 1999, pp. 426-427, vol. 15 No. 5, Oxford University Press, Bielefeld, Germany.
Author Unknown, Paramind Brainstorming Software, Webpages/sites, Archived websites accessed Aug. 7-Oct. 14, 2004, pp. 1-25, Published at: http://www.paramind.net.

*Primary Examiner* — Jesse Pullias
(74) *Attorney, Agent, or Firm* — Lee Law, PLLC; Christopher B. Lee (57) ABSTRACT

A reference string set including a group of strings is set. At least two specific tuples of substring triples is found inside the reference string set of strings. Each tuple is considered as a candidate for representing a related concept. Each concatenation of the substrings triples is an explicit member of the reference string set. Each middle substring of the substring triples is unequal to another middle substring within the substring triples found inside the reference string set. Each prefix substring is equal to all other prefix substrings within the substring triples found inside the reference string set. Each suffix substring is equal to all other suffix substrings within the substring triples found inside the reference string set. Either the prefix substring or the suffix substring is not empty.

25 Claims, 7 Drawing Sheets

STRING PATTERN CONCEPTUALIZATION FROM DETECTION OF RELATED CONCEPTS BY ANALYZING SUBSTRINGS WITH COMMON PREFIXES AND SUFFIXES

RELATED APPLICATIONS

This application is a continuation of and claims priority to and claims the benefit of U.S. patent application Ser. No. 12/347,070 titled "STRING PATTERN CONCEPTUALIZATION METHOD AND PROGRAM PRODUCT FOR STRING PATTERN CONCEPTUALIZATION," which was filed in the United States Patent and Trademark Office on Dec. 31, 2008, which had a title change to "STRING PATTERN CONCEPTUALIZATION FROM DETECTION OF RELATED CONCEPTS BY ANALYZING SUBSTRINGS WITH COMMON PREFIXES AND SUFFIXES," which has a current status of "Allowed," and which is incorporated herein by reference in its entirety; and this application claims priority to and claims the benefit of European Patent Application Serial No. 08100346.9 titled "STRING PATTERN CONCEPTUALIZATION METHOD AND PROGRAM PRODUCT FOR STRING PATTERN CONCEPTUALIZATION," which was filed in the European Patent Office on Jan. 11, 2008, and which is incorporated herein by reference in its entirety.

BACKGROUND

The invention relates to a string pattern conceptualization method and to a program product for string pattern conceptualization.

Searches performed in string patterns such as text or biological sequence data is a commercially prosperous area. However, methods which are used for instance in an Internet environment successfully cannot readily be transferred to enterprise environments. Additionally, content oriented issues become more and more interesting. These methods are semantic-based and less dependent on Internet-specific properties. Compared to link analyses and the like, these methods are far more complex and typically language dependent.

In most of today's computer systems, text representation is not reflecting the real chunks of which the text is composed. In particular, an always co-occurring sequence of words is usually not represented as a chunk, but as a distinct set of words. Knowing the real chunks in a text (i.e., long and very long substrings), however, is desirable for several reasons. It allows for a more compact representation of the text and for a better understanding of the text content, since beginnings and endings of frequently encountered chunks are important spots in the text. In particular, elements occurring adjacently to chunks are frequently related to each other, which for example would allow for an automatic detection of taxonomies.

For reasons of complexity, however, prior art algorithms have problems in finding the maximum substrings even in short texts since the potential number of substrings explodes with the size of the texts.

A main task in content oriented analyses usually is an adequate conceptualization (i.e., acquiring the concepts which are handled in a text as precisely as possible). It is known the art of conceptualization to find a concept of a text in several steps, such as linguistic analysis, noun group determination statistical relevance determination, etc. When processing text for search or other tasks such as conceptualization, categorization, or clustering, the first step usually is to identify a basic set of terms that higher-level components should operate on. This process tries to identify meaningful parts of the overall text, often using immediate context that may be considered as "concepts" or at least "concept candidates."

In most cases, concepts are represented as noun groups in a language in order to find noun groups in a language. In order to find noun groups in text, a syntactic analysis, which is language dependent and computationally expensive, is needed.

In most cases and across languages, noun groups are formed by consecutive elements of the text. In English, usually a sequence of adjectives followed by a sequence of nouns, in German by a sequence of adjectives followed by a single (but potentially compound) noun. Not all noun groups should be truly considered as "concepts" but only as "candidates." Usually, some part of the noun group constitutes the concept (i.e., a class of objects) and the rest has the function to identify a particular object or instance of the concept. Therefore, identifying noun groups is not enough to get to a concept level. Some type of contextual analysis is needed. Besides requiring an enormous computing power, such analyses often are language dependent.

However, even in applications such as genome analysis, although only few letters are used as an "alphabet" to represent the essential components, time and space consuming scaling problems appear.

In the paper of S. Kurz and C. Schleiermacher, "REPuter: fast computation of maximal repeats in complete genomes", Bioinformatics Applications Notes, Oxford University Press, vol. 15, n0. 5, 1999, p. 426-427, a software tool is implemented that computes exact repeats and palindromes in entire genomes. DNA (DNA=desoxyribonucleic acid) is a long polymer made from repeating units called nucleotides, wherein the DNA double helix is held together by hydrogen bonds between four bases attached to the two strands. The four bases found in DNA are adenine (abbreviated A), cytosine (abbreviated C), guanine (abbreviated G) and thymine (abbreviated T). These four bases are attached to the sugar/phosphate in the strands to form the complete nucleotide. Although genomes in DNA can be represented by an alphabet of only four characters (i.e., capital letters A, C, G, T) this reveals inherent scaling problems in the analysis. For instance, 160 MByte storage space are needed for 11 MByte doing the genome analysis. For the handling of 63 characters, however, with 26 capital letters, 26 lower case letters, 10 numbers (0-9), 1 whitespace or even 256 characters for ASCII, the suffix tree in the memory grows dramatically.

BRIEF SUMMARY

The invention provides a string pattern conceptualization method and a program product for string pattern conceptualization.

The features of the independent claims, and the other claims and the specification, disclose advantageous and alternative embodiments of the invention.

A string pattern conceptualization method, particularly for conceptualization of a pattern of words, is proposed, comprising doing the following steps one or more times: setting a reference set of strings; inside the reference set, finding specific N-tuples of substring triples; and considering each N-tuple as a candidate for representing related concepts; where each concatenation of the substrings triples is an explicit member of the reference set; each middle substring is unequal to another middle substring within the substring triples found inside the reference set; each prefix substring is equal to each other prefix substring within the substring triples found inside the reference set; each suffix substring is equal to each other suffix substring within the substring triples found inside the reference set; and either prefix or suffix is not empty.

The proposed method is time and resource efficient when compared to conventional methods, particularly when combined with a method to find maximal substrings in a string pattern, which is described below. The proposed method is virtually independent of language and therefore development effort may significantly be reduced. The proposed method is string based and does not involve linguistic syntactic and/or semantic processing steps. The proposed method is virtually providing approximative substitutes for concepts in a text. As no linguistic analysis is necessary, the proposed method may be much less intense in computing power and independent of the language of the text, particularly when combined with the method for finding maximal substrings described below.

According to another aspect of the invention, a program product comprising a computer useable storage medium including a computer readable program is proposed, wherein the computer readable program when executed on a computer causes the computer to perform the following steps one or more times: setting a reference set of strings; inside the reference set, finding specific N-tuples of substring triples; and considering each N-tuple as a candidate for representing related concepts.

A respective data processing system is also proposed.

The above mentioned string pattern analysis method, particularly for a pattern of words or a bio-informatics pattern, comprises the following iterative steps: defining a subset of substrings in said pattern, keeping track of all said substrings in said subset of substrings, and pruning away each substring that is subsumed by a longer substring in said subset of substrings with same occurrence count. Favorably, the method allows finding maximal substrings in the string pattern. Efficiency is improved resulting in a better scalability of systems which are used to perform the preferred method. These systems may be cheaper and faster. The string pattern analysis method may be used for analyzing mass data such as from bio-informatics, genome analysis, real time data of satellites and the like. The method may be used for content management and search engines, for instance. The method is space and time efficient because it is not necessary to keep track of the complete set of substrings at once. Instead, the method keeps track of only a subset of substrings and prunes away such substrings which are subsumed in other substrings. For instance, a subsumed substring may be a smaller substring that is always co-occurring with the same leading or trailing neighbor and/or may be contained inside the substring and/or may be occurring with the same frequency of occurrence as the substring. This pruning step is very favorable to reduce the complexity in a real occurring string pattern (e.g., text). Typically, in algorithms known in the art the string pattern (e.g. text) has to be stored in full length and usually several times the full length. This results in high computing power needed and high storage consumption. The preferred method is more efficient in computing power and storage consumption. One application of the string pattern analysis method may be conceptualization of text.

The combination of the string conceptualization method and string pattern analysis method may further comprise: defining a minimum number of occurrences (MinOcc) for substrings (STR_A_B) to be pruned away; defining a first minimum length (Lmin__1) of substrings (STR_A_B) to be considered in the first iteration (A=1); defining a first maximum length (Lmax__1) of substrings (STR_A_B) to be considered in the first iteration (A=1); and iteratively doing the following steps: searching the pattern for substrings (STR_A_B) in an interval between said minimum length (Lmin_A) and maximum length (Lmax_B); and doing either leaving the iteration if none of said substrings (STR_A_B) found does have the maximum length (Lmax_A); or continue searching the pattern for substrings with increased new minimum and maximum lengths (Lmin_(A+1), Lmax_(A+1)).

Optionally, such a combination may comprise defining the new minimum length (Lmin_(A+1)) above the maximum length of the previous iteration (Lmax_A) and defining said new maximum length (Lmax_(A+1)) above or equal said new minimum length (Lmin_(A+1)). Additionally, the combination may comprise defining the new minimum length (Lmin_(A+1)) without gap above the maximum length of the previous iteration (Lmax_A).

Such a combination may optionally comprise at least one of the following: pruning away all substrings (STR_A_B) with an occurrence count (Occ_A_B) less than said defined minimum number of occurrence (MinOcc); and presenting maximum substrings (STR_A_C) to a user.

BRIEF DESCRIPTION OF THE SEVERAL VIEWS OF THE DRAWINGS

The present invention together with the above-mentioned advantages may best be understood from the following detailed description of the embodiments, but not restricted to the embodiments, wherein is shown schematically.

DETAILED DESCRIPTION

A preferred string pattern analyzing method comprises the steps of defining a subset of substrings in said pattern, keeping track of all said substrings in said subset of substrings, and pruning away each substring that is subsumed by a longer substring in said subset of substrings with the same occurrence count. The invention is exemplified for text as a string pattern. It is to be understood, however, that the invention is not restricted to text and can be applied to any string pattern such as in genome analysis and the like.

Figure 1:
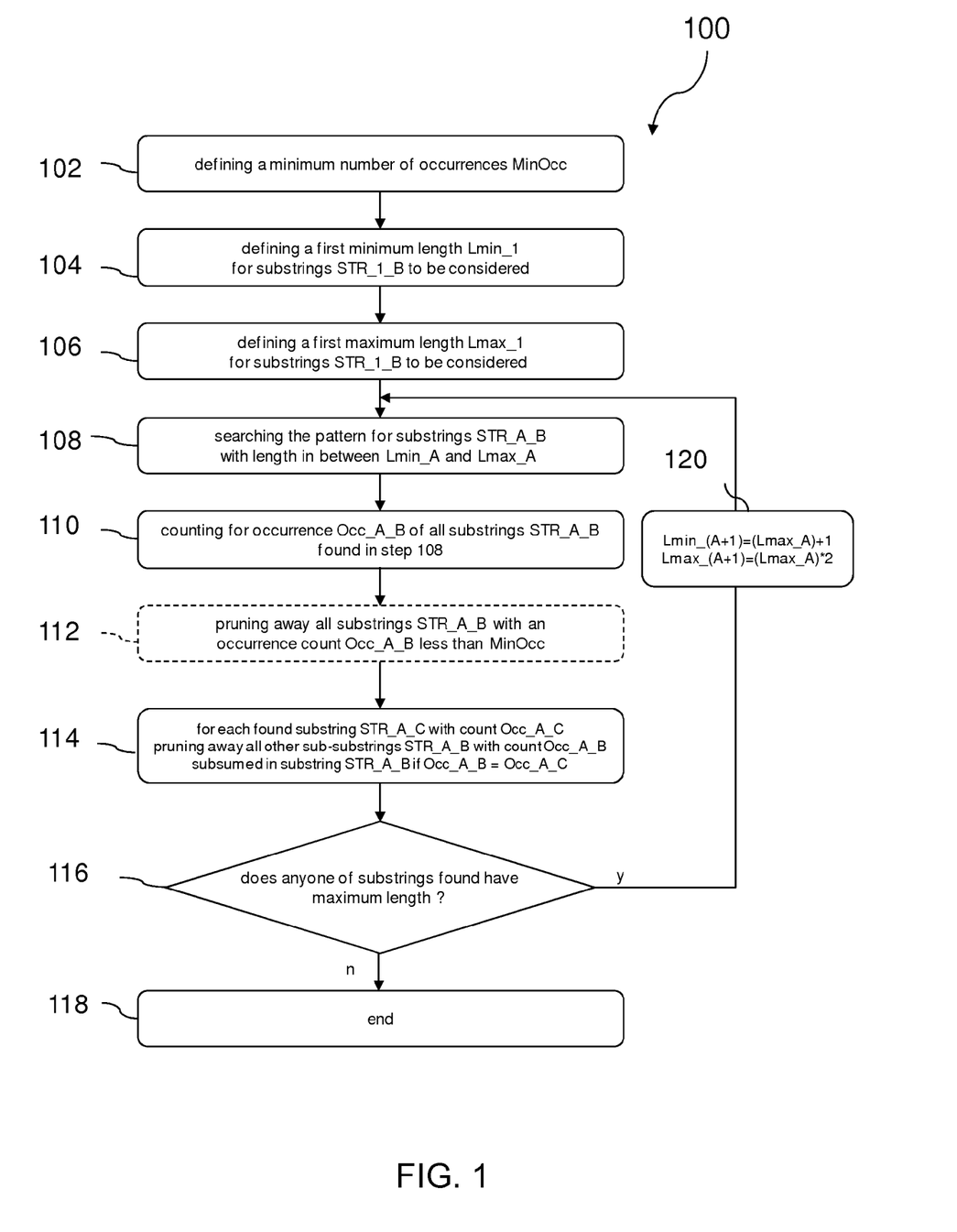
FIG. 1 is an example of an implementation of a flow chart of a preferred string pattern analysis method according to an embodiment of the present subject matter.

A preferred embodiment of the method is depicted as flow chart 100 in FIG. 1, wherein a string pattern is analyzed to find substrings STR_A_B contained in the pattern. A is an index indicating the actual number of the iteration A, with A running between 1 and D, wherein D denotes a total number of iterations A. B is a parameter denoting individual substrings in the iteration step A.

In a first step 102, a threshold for a minimum occurrence MinOcc of a substring STR_A_B is defined, and substrings STR_A_B below said threshold MinOcc are ignored. Preferably, the number of minimum occurrence MinOcc=2. Typically, the threshold for MinOcc is kept constant for all iterations A. However, the minimum occurrence MinOcc may be increased. Due to the threshold, the full and complete text is not considered as one substring STR_A_B. Therefore, substrings STR_A_B are always subsets SET_A of the full text.

In steps 104 and 106 a first minimum length Lmin_1 and a first maximum length Lmax_1 of substrings STR_1_B to be considered in a first iteration step with A=1 looping over the text are defined. Preferred first values are Lmin_1=1 and Lmax_1=5, for instance.

In step 108, the pattern is searched for substrings STR_1_B with a length in an interval between said minimum length Lmin_1 and said maximum length Lmax_1.

Step 110 is counting for occurrence Occ_A_B of each substring STR_A_B found with lengths in the interval between Lmin_1 and Lmax_1.

In optional step 112, all substrings STR_A_B with an occurrence count Occ_A_B less than the minimum occurrence threshold MinOcc are pruned away.

For each iteration A, a subset of substrings SET_A is defined in the pattern. The set SET_A of substrings STR_A_B is different for each iteration A. It is kept track of all the substrings STR_A_B and the occurrence counts Occ_A_B in said subset SET_A of substrings (SET_A).

Step 114 is pruning away for each found substring STR_A_C all other sub-substrings STR_A_B that are at least one of (1) being contained inside the substring STR_A_C in said subset SET_A of substrings STR_A_B, (2) being shorter than the substring STR_A_C, (3) occurring with the same frequency as the substring STR_A_C (i.e., with same occurrence count Occ_A_C). Preferably, all three conditions are fulfilled for substrings STR_A_B being pruned away. Due to this step, the amount of substrings STR_A_B to be stored and analyzed is dramatically reduced to the number of maximum substrings STR_A_C. The index C denotes the maximum substring.

If none of the substrings STR_A_B found has the maximum length Lmax_A (step 116), the loop is left (end in step 118). If at least one substring STR_A_B has a length of Lmax_A, new minimum and maximum lengths are defined in step 120 and steps 108-116 are repeated in the next iteration loop with A=A+1. Preferably, the iteration A may stop, for instance, if a maximum number D of iterations A or a predefined maximum length Lmax_A is exceeded. Preferably, the substrings STR_A_C found may be stored in a TRIE structure or any other suitable structure.

Step 120 is defining a new minimum and maximum length variables with the new minimum length set to Lmin_(A+1)=(Lmax_A)+1 and the new maximum length set to Lmax_(A+1)=Lmax_A)*2.

The preferred method is, when applied to a text, independent of language. Therefore, it may enable advanced text functions not covered today when applied to a text.

By way of example, when all maximal substrings STR_A_C in a text are found with the preferred method, in a very simple embodiment all maximal substrings STR_A_C may be used as an approximative substitute for concepts of the text. This may be improved when statistical relevance of the maximal substrings STR_A_C found is included. An additional preprocessing step prior to identifying maximal substrings STR_A_C may be performed, and thus linguistic variants of words contained in the substrings may be eliminated, which results in improvement of the quality of the substrings found. Additionally or alternatively, it is possible to reduce inflected forms of words in the pattern to their morphological stems. This is still cost efficient as no sophisticated complex linguistic analysis is necessary. The substring STR_A_C found may be presented to a user, preferably together with its count. Further, when determining sub-substrings STR_A_B of each of the identified maximal substrings STR_A_C, a statistical filter may be applied to avoid "overfitting". Such sub-substrings STR_A_B may be considered in a statistical and/or a linguistic based selection procedure. For instance, if a maximal substring in a text is "ABC CORPORATION HAS", the verb "HAS" may be omitted.

A further quality improvement may be achieved if the method blinds out the highest detail level and goes back to a lower detail level if a frequency of one or more maximal substrings STR_A_B found in the text drops below a defined threshold (e.g., if the maximal substring STR_A_C found become very rare). This threshold may be chosen dependent on the complexity of the text or the like.

This example elucidated above is one possible usage of the method to identify maximal substrings STR_A_C in a text.

The invention may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer readable medium providing program code for use by or in connection with a computer or any instruction execution system. For the purposes of this description, a computer-usable or computer readable medium may be any apparatus that may contain, store, communicate, or transport the program for use by or in connection with the instruction execution system, apparatus, or device.

The medium may be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

Figure 2:
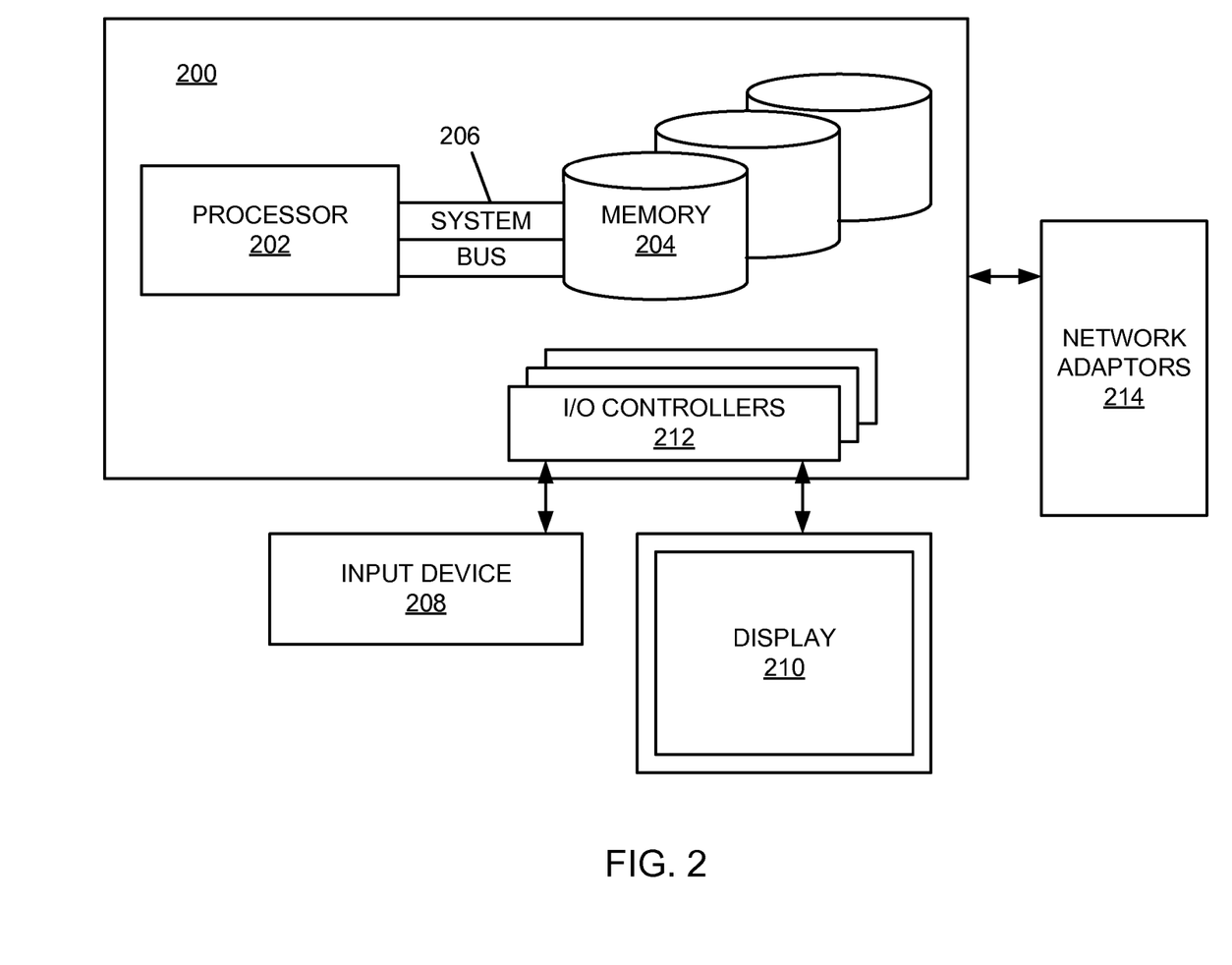
FIG. 2 is a block diagram of an example of an implementation of a preferred data processing system for performing the preferred method according to FIG. 1 according to an embodiment of the present subject matter.

A preferred data processing system 200 (computer) as depicted in FIG. 2 suitable for storing and/or executing program code will include at least one processor 202 coupled directly or indirectly to memory elements 204 through a system bus 206. The memory elements 204 may include local memory employed during actual execution of the program code, bulk storage, and cache memories which provide temporary storage of at least some program code in order to reduce the number of times code must be retrieved from bulk storage during execution.

Input/output or I/O-devices 208, 210 (including, but not limited to keyboards, displays, pointing devices, etc.) may be coupled to the system 200 either directly or through intervening I/O controllers 212.

Network adapters 214 may also be coupled to the system 200 to enable the data processing system or remote printers or storage devices through intervening private or public networks. Modems, cable modem and Ethernet cards are just a few of the currently available types of network adapters.

Figure 3A:
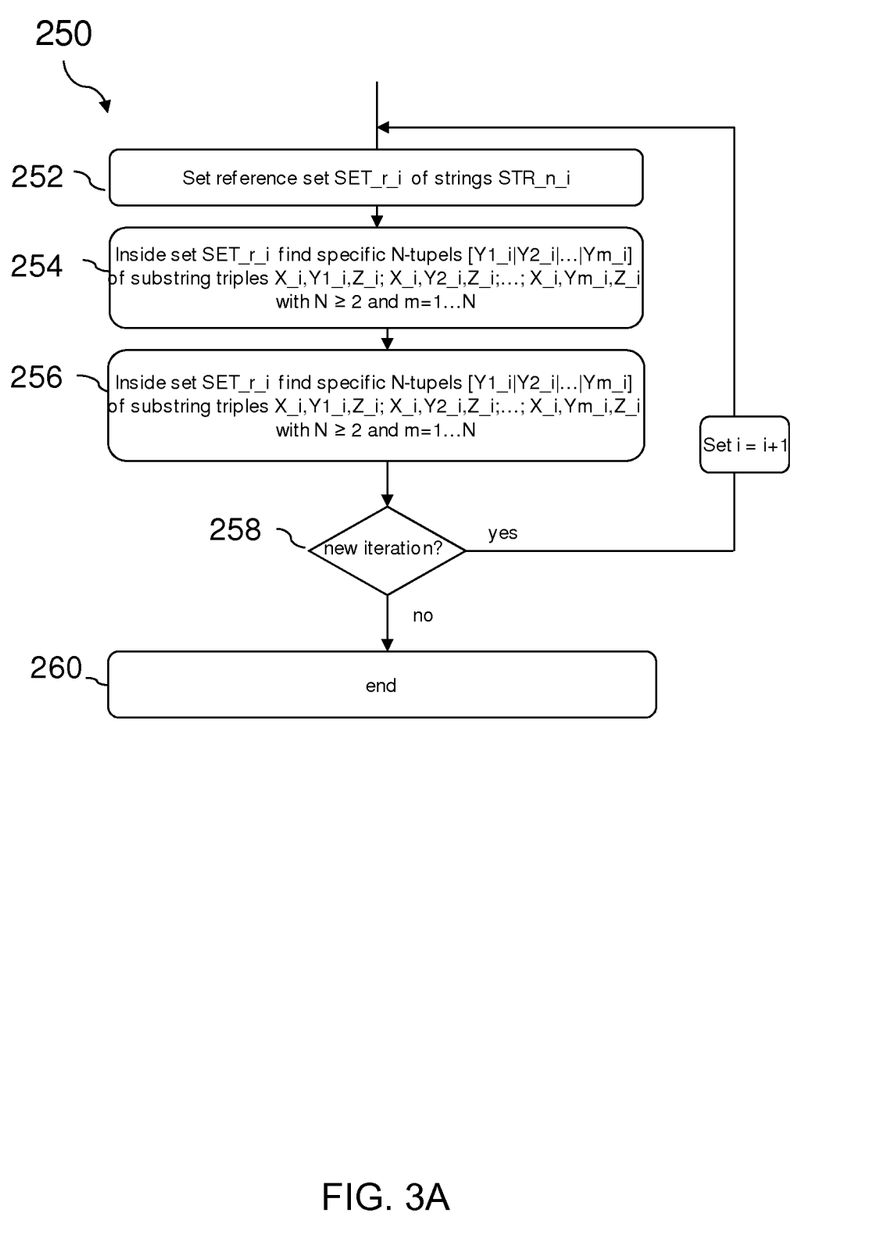
FIG. 3a is an example of an implementation of a flow chart of a first portion of a first preferred conceptualization method for a string pattern according to an embodiment of the present subject matter.

Another preferred aspect of the invention considers a string-pattern-conceptualization method is depicted in a flowchart 250 in FIG. 3a. By way of example, maximal substrings found in a method as elucidated above may be applied in such a conceptualization method. The preferred conceptualization method, however, is not restricted to the use of maximal substrings, instead, any set of substrings of a string pattern may be used.

The goal is to compute a set SN of N-tuples of strings; in the following, these N-tuples of strings are called "N-siblings". It is of interest to find the maximum set (i.e., all N-siblings for $N \geq 2$). Ranking the set SN and pruning the set SN to the set most relevant to a given scenario is an optional preferred embodiment.

Preferably, the string pattern may be a text. The method provides an approximative conceptualization by detecting related concepts from a given amount of text (e.g., in a search machine). The preferred method is time and resource efficient, particularly when combined with the preferred string pattern analysis method to find maximal substrings in a string pattern as described above. In order to avoid unnecessary repetitions, reference is made to the preceding description of the string pattern analysis method if such an analysis method should be combined with the preferred conceptualization method.

First, a string concatenation operator $\otimes$ is defined:

$X \otimes Y$ means that the strings X and Y are concatenated. $(X \otimes Y) \otimes Z$ is equivalent to $X \otimes (Y \otimes Z)$ and is abbreviated to $X \otimes Y \otimes Z$.

Let R be a set of strings (i.e., a "reference set"),

U defines the universe of all strings,

X, Y1, Y2, ..., YN, Z defines elements of U, e defines the empty string;

then SN, the set of "N-siblings", is defined as $$SN = \left\{ (Y1, \ldots, YN) \middle| \underset{1 \leq i \leq N}{\forall} Yi \neq e \wedge \underset{i \neq j}{\forall} Yi \neq Yj \wedge \exists X \in U, Z \in U : \left( \underset{1 \leq i \leq N}{\forall} X \otimes Yi \otimes Z \in R \wedge (X \neq e \vee Z \neq e) \right) \right\}$$

In the simplest case, index N=2. In this case, it is looked for "2-siblings", i.e. pairs of substrings:

$$S2 = \{(Y1, Y2) | Y1 \neq e \wedge Y2 \neq e \wedge Y1 \neq Y2 \wedge \exists X \in U, Z \in U : (X \otimes Y1 \otimes Z \in R \wedge X \otimes Y2 \otimes Z \in R \wedge (X \neq e \vee Z \neq e))\}$$

This means that siblings Y1, Y2 are searched which are different from each other and both occur in the set of strings R as concatenations of identical prefixes X and suffixes Z, where at least the prefix X or the suffix Z is non-empty.

The reference set R is denoted as SET_r_i in the following text, but R is used instead of SET_r_i for the above-mentioned formulas for compactness of the formulas.

As an example, assume that the set SET_r_i of strings consists just of these two strings:

1. "If the process is a long-running business process then the output is",
2. "If the process is a microflow then the output is".

Here, the set of 2-siblings contains the two substrings Y1, Y2 with

Y1="long-running business process"

Y2="microflow"

because there exists a prefix X

X="If the process is a"

and there exists a suffix Z

Z="then the output is"

which do satisfy all required constraints above.

In a more general case, this method may allow the empty string to be one of the siblings; semantically this means that the concepts of a set of siblings of which one sibling is the empty string represent optional concepts, that may or may not occur in a particular context.

In this more general case, the formula simplifies to:

$$SN = \left\{ (Y1, \ldots, YN) \middle| \underset{i \neq j}{\forall} Yi \neq Yj \wedge \exists X \in U, Z \in U : \left( \underset{1 \leq i \leq N}{\forall} X \otimes Yi \otimes Z \in R \wedge (X \neq e \vee Z \neq e) \right) \right\}$$

and the associated formula for N=2 simplifies to:

$$S2 = \{(Y1, Y2) | Y1 \neq Y2 \wedge \exists X \in U, Z \in U : (X \otimes Y1 \otimes Z \in R \wedge X \otimes Y2 \otimes Z \in R \wedge (X \neq e \vee Z \neq e))\}$$

FIG. 3a depicts a flow chart 250 representing a preferred string pattern conceptualization method, particularly for a pattern of words. The preferred method represents a quite general case and comprises the steps which are done one or i more times of setting a reference set SET_r_i (in the example above denoted as R) of strings STR_n_i in step 252. The reference set SET_r_i may or may not by way of example consist of maximal substrings. The strings STR_n_i may overlap each other. In step 254, inside the reference set SET_r_i, a search is done in step 254 for finding specific N-tuples of substring triples X_i,Y1_i,Z_i; X_i,Y2_i,Z_i; ...; X_i,Ym_i,Z_i with $N \geq 2$ and m=1 ... N. In step 256 each N-tuple ([Y1_i|Y2_i| ... |Ym_i]) is considered as a candidate for representing related concepts, wherein each concatenation X_i$\otimes$Y1_i$\otimes$Z_i; X_i$\otimes$Y2_i$\otimes$Z_i; ...; X_i$\otimes$Ym_i$\otimes$Z_i of the substrings triples X_i,Y1_i,Z_i; X_i,Y2_i,Z_i; ...; X_i,Ym_i,Z_i is an explicit member of the reference set SET_r_i. Each middle substring out of Y1_i, Y2_i, ..., Ym_i is unequal to another middle substring out of Y1_i, Y2_i, ..., Ym_i within the substring triples X_i,Y1_i,Z_i; X_i,Y2_i,Z_i; ...; X_i,Ym_i,Z_i found inside the reference set SET_r_i. Each prefix substring X_i is equal to all other prefix substrings X_i within the substring triples X_i,Y1_i,Z_i; X_i,Y2_i,Z_i; ...; X_i,Ym_i,Z_i found inside the reference set SET_r_i. Each suffix substring Z_i is equal to all other suffix substrings Z_i within the substring triples X_i,Y1_i,Z_i; X_i,Y2_i,Z_i; ...; X_i,Ym_i,Z_i found inside the reference set SET_r_i, and either prefix X_i or suffix Z_i is not empty. In step 258, it is checked if a new iteration has to be done, if yes, the iteration index is increased by one and the loop starts again at step 252. If no, the iteration ends in step 260.

Figure 3B:
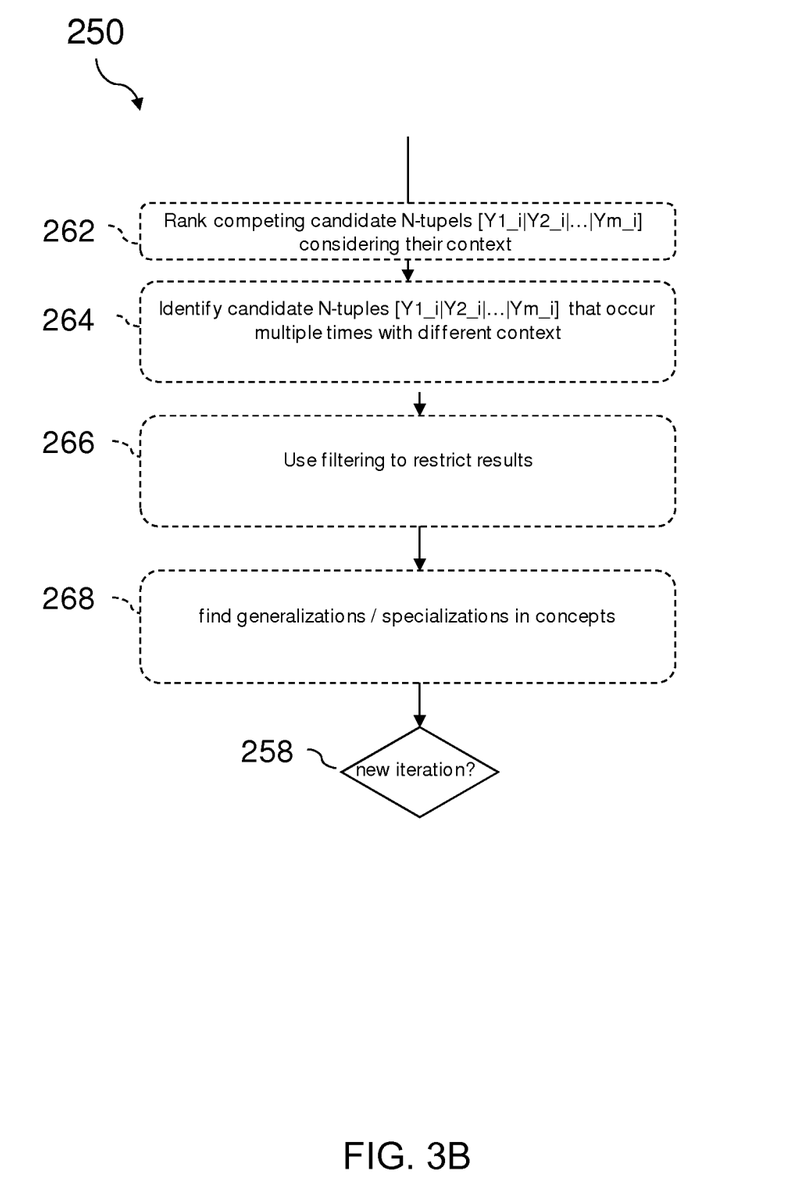
FIG. 3b is an example of an implementation of a flow chart of a second portion of a first preferred conceptualization method for a string pattern according to an embodiment of the present subject matter.

Optional steps between steps 256 and 258 of flow chart 250 which optional steps may be performed individually or in combination of any of the optional steps are indicated in FIG. 3b. In optional step 262, competing candidate N-tuples [Y1_i|Y2_i| ... |Ym_i] are ranked considering their context.

For ranking it is favourable to denote each string STR_n_i with its occurrence count OCC_n_i and rank according to the occurrence. An example for this is given below with reference to FIG. 4a.

In optional step 264, candidate N-tuples [Y1_i|Y2_i| . . . |Ym_i] are identified that occur multiple times with different context. In optional step 266, filtering can be used to restrict results. In optional step 268, generalizations/specializations may be found in concepts.

Figure 4A:
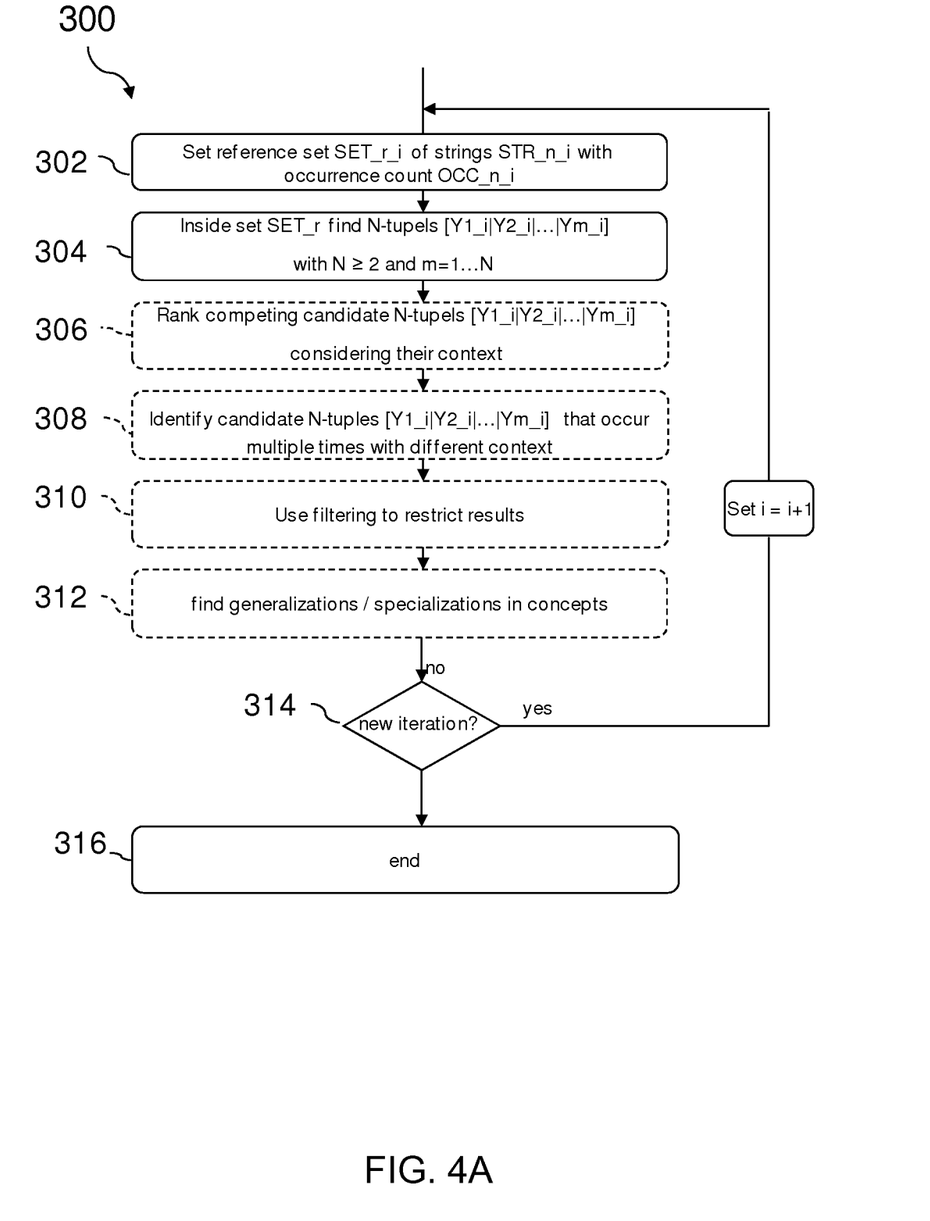
FIG. 4a is an example of an implementation of a flow chart of a first portion of a second preferred conceptualization method for a string pattern for N-tuples with N=2 according to an embodiment of the present subject matter.

FIG. 4a depicts a flow chart 300 representing another preferred embodiment of the string pattern conceptualization method, particularly for a pattern of words. The preferred embodiment comprises the steps which are done one or i more times of (1) setting a reference set SET_r_i of strings STR_n_i and (2) denoting each string STR_n_i with its occurrence count OCC_n_i in step 302. The reference set SET_r_i may by way of example consist of maximal substrings. The strings STR_n_i may overlap each other. Inside the reference set SET_r_i, a search is done in step 304 for finding specific N-tuples of substring triples X_i,Y1_i,Z_i; X_i,Y2_i,Z_i; . . . ; X_i,Ym_i,Z_i with N≧2 and m=1 . . . N. Each N-tuple [Y1_i|Y2_i|Ym_i] is considered as a candidate for representing related concepts.

With N=2 the N-tuple is a pair [Y1|Y2] of substring triples X_i,Y1_i, Z_i and X_i,Y2_i,Z_i. With N=3 the N-tuple is a triple [Y1|Y2|Y3] of substring triples X_i,Y1_i,Z_i; X_i, Y2_i,Z_i; X_i,Y3_i,Z_i, etc. For each iteration i, the reference set SET_r_i reasonably is a different set of strings STR_n_i. By way of example, the method may be done either by running the algorithm for pairs and then doing post-processing of the results by creating groups from pairs or it may be done directly from the algorithm.

As already expressed as relational formula above, the N-tuples [Y1_i|Y2_i| . . . |Ym_i] inside the SET_r_i preferably fulfill the following constraints:

Constraint 1: Each concatenation X_i⊗Y1_i⊗Z_i; X_i⊗Y2_i⊗Z_i; . . . ; X_i⊗Ym_i⊗Z_i of the substring triples X_i,Y1_i,Z_i; X_i,Y2_i,Z_i; . . . ; X_i,Ym_i,Z_i is an explicit member of the reference set SET_r_i. The middle substrings Y1, Y2, . . . , Ym may be, but do not have to be, explicit members. As well, the prefix substrings X_i and the suffix substrings Z_i may be, but do not have to be, explicit members.

Constraint 2: Each middle substring Y1_i, Y2_i, . . . , Ym_i is unequal to another middle substring Y1_i, Y2_i, . . . , Ym_i within the substring triples X_i,Y1_i,Z_i; X_i,Y2_i,Z_i; . . . ; X_i,Ym_i,Z_i found inside the reference set SET_r_i.

Constraint 3: All prefix substrings X_i within the substring triples X_i,Y1_i,Z_i; X_i,Y2_i,Z_i; . . . ; X_i,Ym_i,Z_i found inside the reference set SET_r_i are identical.

Constraint 4: All suffix substrings Z_i within the substring triples X_i,Y1_i,Z_i; X_i,Y2_i,Z_i; . . . ; X_i,Ym_i,Z_i found inside the reference set SET_r_i are identical.

Constraint 5: Either prefix X_i or suffix Z_i is not empty.

N-tuples [Y1_i|Y2_|Ym_i] which fulfill these constraints may be considered as candidates for being related concepts in the conceptualization algorithm.

In a first optional step 306 refinements of the base algorithm described in steps 302 and 304 may be made by ranking competing candidates according to specific criteria.

In a first refinement, N-tuples [Y1_i|Y2_i| . . . |Ym_i] considering their context is performed. The context is to be understood as the prefix and/or suffix string X_i, Z_i accompanying the middle substrings Y1_1, Y2_i, . . . , Ym_i. A frequent prefix and/or suffix string X_i, Z_i is weighted lower than a less frequent prefix and/or suffix string X_i, Z_i.

For ranking, one or more of the following criteria (1), (2), (3) are used:

Criteria (1) and (2) are provided in optional step 306:

(1) Let occurrence sum Occ_sum_i be the sum of all occurrences of the strings X_i⊗Y1_i⊗Z_i; . . . ; X_i⊗Ym_i⊗Z_i. Let occurrence Occ_x_i be the occurrence of prefix string X_i. Make sure that both values X_i and occ_sum_i are >0. Then, build a rank Rank_i as the quotient Rank_i=Occ_sum_i*Square(Occ_sum_i/Occ_x_i). Rank candidates with the highest rank Rank_i representing the most significant result.

(2) Let occurrence sum Occ_sum_i be the sum of all occurrences of the strings X_i⊗Y1_i⊗Z_i; . . . ; X_i⊗Ym_i⊗Z_i. Let occurrence Occ_z_i be the occurrence of suffix string Z_i. Make sure that both values Z_i and Occ_sum_i are >0. Then, build a rank Rank_i as the quotient Rank_i=Occ_sum_i*Square(Occ_sum_i/Occ_z_i). Rank candidates with the highest rank Rank_i representing the most significant result.

The formulas used in the criteria (1) and (2) do factor in as squared term the affinity between X_i, Z_i, and the middle substrings: if these prefixes and suffixes co-occur almost exclusively with the found middle strings, this deserves a high rank. In addition, the formulas factor is as linear term the frequencies of the complete concatenations: if this number is significantly high, this deserves a high rank.

By way of example, frequent substrings like "the . . . and" with X=the and Z=and may be eliminated by criteria (1) and (2).

Here are the values for an example with concrete numbers:

Occ_sum_i=700, Occ_x_i=800==>Rank_i=535.9

Occ_sum_i=70, Occ_x_i=80==>Rank_i=53.6

Occ_sum_i=4000, Occ_x_i=8000==>Rank_i=1000

Occ_sum_i=7, Occ_x_i=8==>Rank_i=5.4

Occ_sum_i=400, Occ_x_i=800==>Rank_i=100

Occ_sum_i=70, Occ_x_i=800==>Rank_i=5.4

Occ_sum_i=7, Occ_x_i=80==>Rank_i=0.5

Other appropriate formulas may be used in a similar way.

Criterion (3) comprised in optional step 308 provides a further refinement of the base algorithm or anyone of the refinements elucidated above. Ranking of candidates may be done by considering multiple independent occurrences of N-tuples [Y1_i|Y2_i| . . . |Ym_i] takes advantage of multiple independent occurrences. This is achieved by doing at least one of:

(a) Using an occurrence count of multiple occurrences as ranking value. This is preferably done when criteria (1) and/or (2) are not applied.

(b) Merge multiple occurrences of candidate pairs, computing the new merged ranks by adding the unmerged rank. This is preferably done if at least one of criteria (1) and (2) are applied.

(c) Allow permutations of the middle substrings Y1_i; Y2_i and merge multiple occurrences of candidate pairs, computing the new merged ranks by adding the unmerged rank.

Rank candidates with the highest rank being the most significant result.

In next optional step 310 a refinement of the base algorithm or anyone of the refinement steps 306, 308 may be performed by filtering a result of one or more N-tuples [Y1_i|Y2_i| ... |Ym_i] found as candidates for representing related concepts considering specific types of a desired result. The analysis may be focused on specific results the user may want to find.

For filtering at least one of the following may be done:
(1) Using a minimum length for middle substrings Y1_i, Y2_i, ..., Ym_i. This filter makes sure that candidate pairs where the empty sub string is one of the siblings is the empty string is excluded from the output.
(2) Using a maximum length for the middle substrings Y1_i, Y2_i, ..., Ym_i. This filter makes sure that related concepts found by the algorithm are within a certain length. The result is compact.
(3) Using a minimum length for at least one of the prefix and suffix string X_i, Z_i. This filter makes sure that related concepts found do share a left-hand-side (prefix) and/or a right-hand-side (suffix) context.
(4) Requesting that the prefix string X_i ends with a particular regular expression. For example, X may be forced to end (not to end) with a blank, to suppress (enforce) discovery of different word endings for the same word stem. For example, the following candidate pair would be suppressed (enforced) in this case: X="order", Z="the goods", Y1="ed", Y2="ing".
(5) Requesting that the suffix string Z_i starts with a particular regular expression. For example, Z may to forced the start with a blank.
(6) Requesting that at least one of the middle strings Y1_i, Y2_i, ..., Ym_i has a certain value V. This filter allows to find conceptual synonyms for V.

In optional refinement step 312 generalizations and/or specializations in concepts may be revealed. This may be achieved by comparing at least two occurrence counts Occ__1, Occ__2, ..., Occ_m if two or more of the middle strings Y1_i, Y2_i, ..., Ym_i and/or if two or more concatenations of prefix and middle strings X_i+Y1_i; X_i+Y2_i; ...; X_i+Ym_i are explicit members of the reference set SET_r. By way of example, if the occurrence count, e.g. Occ__4, of a first respective middle string, e.g. Y4_i, is significantly greater than the occurrence count Occ__1, Occ__2, ..., Occ_m of another middle string Y1_i, Y2_i, ..., Ym_i being compared with, the respective first middle string, e.g. Y4_i, may reasonably be considered being a more generalized concept than the other middle string Y1_i, Y2_i, ..., Ym_i.

In decision step 314 it is decided if another iteration shall be done. If yes, iteration index i is set to i=i+1 and steps 302 to 314 are repeated. If no, next step 316 is the end of the algorithm.

Figure 4B:
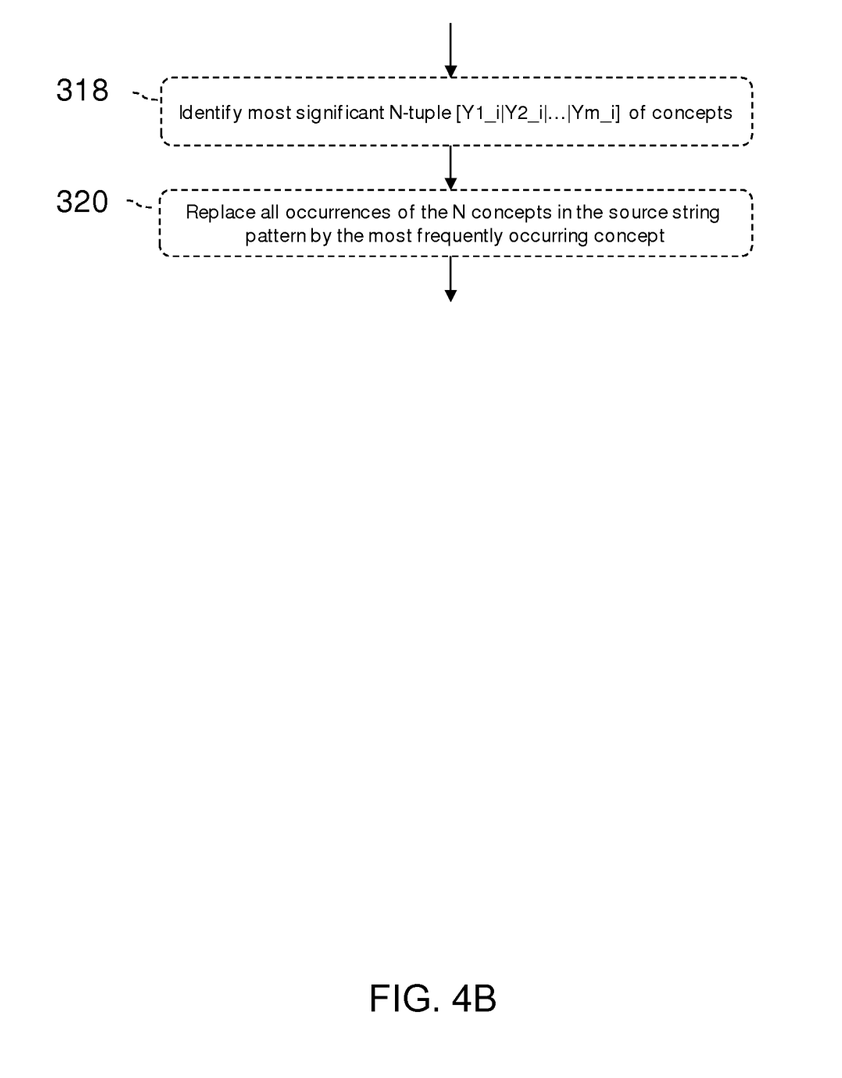
FIG. 4b is an example of an implementation of a flow chart of a second portion of a second preferred conceptualization method for a string pattern for N-tuples with N=2 according to an embodiment of the present subject matter.

A further favorable refinement of the algorithm depicted in FIG. 4b may be done as a refinement of either of the previous refinement and base algorithm steps 302-304 by iteratively calling algorithm.

The algorithm as described so far is run to identify the most significant N-tuple [Y1_i|Y2_i| ... |Ym_i] of concepts at step 318.

Here, one or more occurrences of the N concepts in the string pattern are replaced by the most frequent occurring concept yielding an altered string pattern at step 320. For example, a copy of a source text is made and all occurrences of the N-tuples [Y1_i|Y2_i| ... |Ym_i] are replaced by the most frequently occurring concept. Then the algorithm is rerun on that copy of the source text (i.e., doing the steps in the altered string pattern as elucidated in FIG. 3a).

According to a preferred embodiment of the invention, a program product comprising a computer useable storage medium including a computer readable program is proposed, wherein the computer readable program when executed on a computer causes the computer to doing one or i times
(1) setting a reference set SET_r_i of strings STR_n_i;
(2) inside the reference set SET_r_i, finding specific N-tuples [Y1_i|Y2_i| ... Ym_i] of substring triples X_i,Y1_i,Z_i; X_i,Y2_i,Z_i; ...; X_i,Ym_i,Z_i with $N \geq 2$ and m=1 ... N; and
(3) considering each N-tuple [Y1_i|Y2_i| ... |Ym_i] as a candidate for representing related concepts.

Preferably, each string STR_n_i may be denoted with its occurrence count OCC_n_i. This is favorably done when the candidates should be ranked.

By way of example some results are shown. Imagine that the algorithm discovers that the following related concepts are the most significant pair of related concepts:
Y1=" " (string consisting only of the blank character)
Y2="\" (string consisting only of the newline character). Thereby, Y1 is more frequent than Y2. Then replace all newlines by blanks and then rerun the algorithm on the modified text.

Other examples may be performed by running the algorithm on a BPC samples web site.

A filter is "show only concepts surrounded by blanks" as related concepts. Three most significant pairs in output are these:
'input' and 'output' (context:'•ClientObjectWrapper $$$=bfm.c')
'ready' and 'finished' (context:'is in the $$$ state. </p>•')
'long-running business process,' and 'microflow,' (context: 'process is a $$$ the process output message is').

Running the algorithm (e.g., on BPC same samples web site), the filter is set to 1 to 3 characters. This yields a most significant pair in output with unbalanced occurrence count: ' ' and '\n' (blank character and newline character), wherein the blank is much more general than newline character.

Furthermore, the invention may take the form of a computer program product accessible from a computer-usable or computer readable medium providing program code for use by or in connection with a computer or any instruction execution system. For the purposes of this description, a computer-usable or computer readable medium may be any apparatus that may contain, store, communicate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

Figure 5:
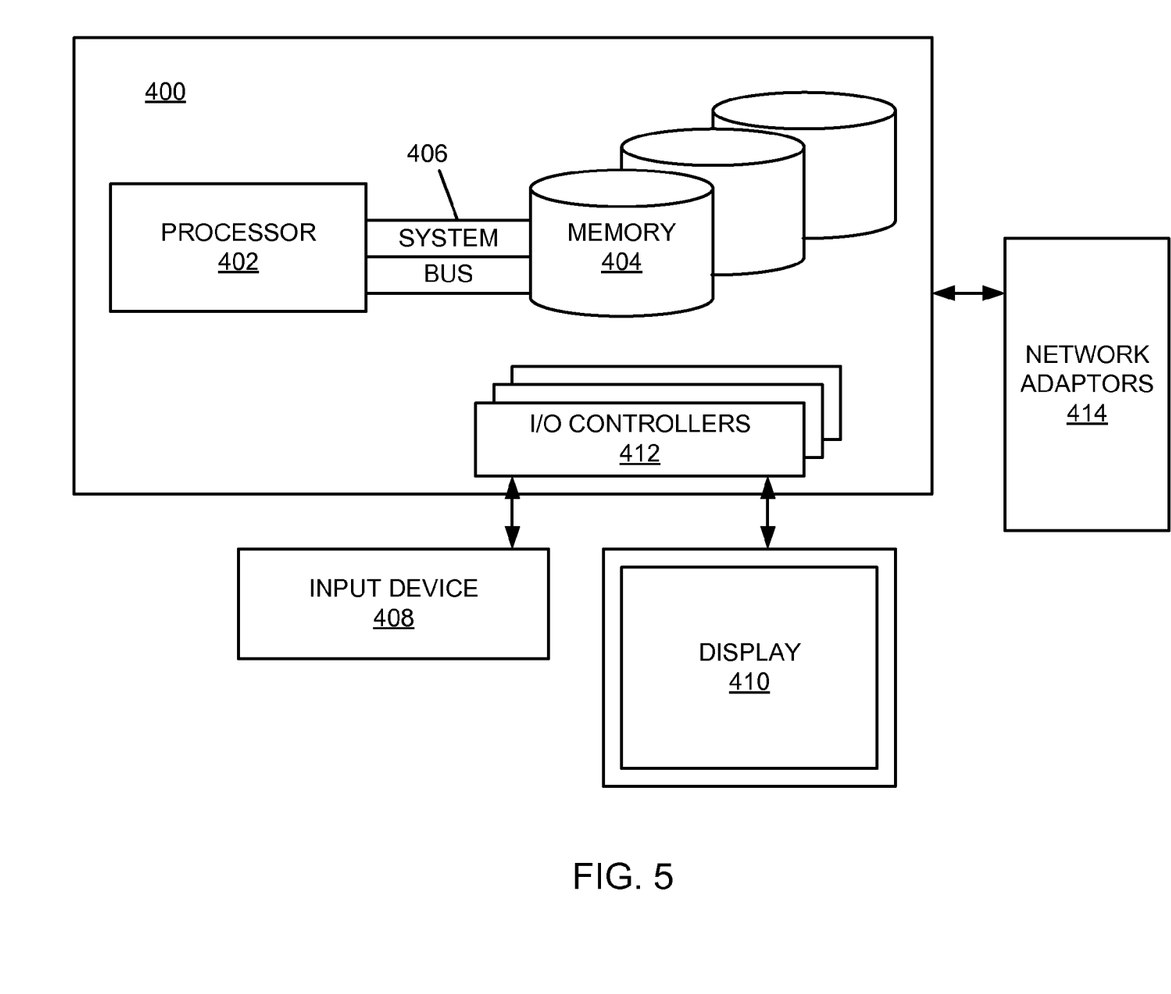
FIG. 5 is an example of an implementation of a preferred data processing system for performing the preferred method according to FIG. 3a and FIG. 3b.

A preferred data processing system 400 (computer) as depicted in FIG. 5 suitable for storing and/or executing program code will include at least one processor 402 coupled directly or indirectly to memory elements 404 through a system bus 406. The memory elements 404 may include local memory employed during actual execution of the program code, bulk storage, and cache memories which provide temporary storage of at least some program code in order to reduce the number of times code must be retrieved from bulk storage during execution.

Input/output or I/O-devices 408, 410 (including, but not limited to keyboards, displays, pointing devices, etc.) may be coupled to the system 400 either directly or through intervening I/O controllers 412.

Network adapters 414 may also be coupled to the system 400 to enable the data processing system or remote printers or storage devices through intervening private or public networks. Modems, cable modem and Ethernet cards are just a few of the currently available types of network adapters.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A string pattern conceptualization method, particularly for a pattern of words, comprising:
    setting, via a processor, a reference string set comprising a plurality of strings;
    finding, inside the reference string set comprising the plurality of strings, at least two specific tuples of substring triples that each comprise a prefix substring, a middle substring, and a suffix substring; and
    considering each tuple as a candidate for representing a related concept;
    where:
        each concatenation of the substring triples is an explicit member of the reference string set;
        each middle substring of the substring triples is unequal to another middle substring within the substring triples found inside the reference string set;
        each prefix substring of the substring triples is equal to all other prefix substrings within the substring triples found inside the reference string set;
        each suffix substring of the substring triples is equal to all other suffix substrings within the substring triples found inside the reference string set; and
        either the prefix substring of the substring triples or the suffix substring of the substring triples is not empty.

2. The method of claim 1, further comprising ranking the candidate tuples according to attributes of at least one of the prefix substring of the substring triples and the suffix substring of the substring triples.

3. The method of claim 1, further comprising filtering a result of one or more tuples of substrings found as candidates for representing the related concept considering specific types of a desired result.

4. The method of claim 3, where filtering the result of the one or more tuples of substrings found as the candidates for representing the related concept considering the specific types of the desired result comprises at least one of:
    using a minimum length for the middle substrings;
    using a maximum length for the middle substrings;
    using a minimum length for at least one of the prefix substrings and the suffix substrings;
    requesting that the prefix substring ends with a particular regular expression;
    requesting that the suffix substring starts with a particular regular expression; and
    requesting that at least one of the middle substrings has a certain string value.

5. The method of claim 1, further comprising comparing at least two occurrence counts if at least one of two or more of the middle substrings and two or more concatenations of the prefix substrings and the middle substrings are explicit members of the reference string set.

6. The method of claim 5, further comprising at least one of:
    if the occurrence count of a first respective middle substring is significantly less than the occurrence count of another middle substring being compared with the first respective middle substring, considering the first respective middle substring as being a specialized concept of the other middle substring; and
    if the occurrence count of the first respective middle substring is significantly greater than the occurrence count of another middle substring being compared with the first respective middle substring, considering the first respective middle substring as being a generalized concept of the other middle substring.

7. The method of claim 1, further comprising replacing one or more occurrences of concepts in the tuples with a most frequently occurring concept yielding an altered string pattern.

8. The method of claim 7, further comprising, in the altered string pattern:
    setting the reference string set comprising the plurality of strings;
    denoting each string with its occurrence count;
    finding, inside the reference string set comprising the plurality of strings, specific substring triples of substring tuples of the at least two specific tuples;
    considering each tuple as the candidate for representing the related concept;
    where:
        each prefix substring of the substring triples and each suffix substring of the substring triples is an explicit member of the reference string set;
        each concatenation of the substrings triples is an explicit member of the reference string set;
        each middle substring of the substring triples is unequal to another middle substring within the substring triples found inside the reference string set; and
        either the prefix substring of the substring triples or the suffix substring of the substring triples is not empty.

9. The method of claim 1, further comprising using a method for analysis of a string pattern, particularly for a pattern of words or a genome pattern, for providing maximum substrings as an input for the conceptualization method, comprising, for at least one iteration:
    defining a subset of substrings in the pattern of words;
    tracking all the substrings and their occurrence counts in the subset of substrings; and
    pruning away each substring if the substring is subsumed by a longer substring in the subset of substrings with a same occurrence count.

10. A computer program product for string pattern conceptualization, particularly for a pattern of words, comprising:
    a computer readable storage device having computer readable program code embodied therewith, where the computer readable program code when executed on a computer causes the computer to:
    set a reference string set comprising a plurality of strings;
    find, inside the reference string set comprising the plurality of strings, at least two specific tuples of substring triples that each comprise a prefix substring, a middle substring, and a suffix substring; and
    consider each tuple as a candidate for representing a related concept;
    where:
        each concatenation of the substring triples is an explicit member of the reference string set;

each middle substring of the substring triples is unequal to another middle substring within the substring triples found inside the reference string set;

each prefix substring of the substring triples is equal to all other prefix substrings within the substring triples found inside the reference string set;

each suffix substring of the substring triples is equal to all other suffix substrings within the substring triples found inside the reference string set; and either the prefix substring of the substring triples or the suffix substring of the substring triples is not empty.

11. The computer program product of claim 10, where the computer readable program code when executed on the computer further causes the computer to rank the candidate tuples according to attributes of at least one of the prefix substring of the substring triples and the suffix substring of the substring triples.

12. The computer program product of claim 10, where the computer readable program code when executed on the computer further causes the computer to filter a result of one or more tuples of substrings found as candidates for representing the related concept considering specific types of a desired result.

13. The computer program product of claim 12, where, in causing the computer to filter the result of the one or more tuples of substrings found as the candidates for representing the related concept considering the specific types of the desired result, the computer readable program code when executed on the computer causes the computer to at least one of:

use a minimum length for the middle substrings;
use a maximum length for the middle substrings;
use a minimum length for at least one of the prefix substrings and the suffix substrings;
request that the prefix substring ends with a particular regular expression;
request that the suffix substring starts with a particular regular expression; and
request that at least one of the middle substrings has a certain string value.

14. The computer program product of claim 10, where the computer readable program code when executed on the computer further causes the computer to compare at least two occurrence counts if at least one of two or more of the middle substrings and two or more concatenations of the prefix substrings and the middle substrings are explicit members of the reference string set.

15. The computer program product of claim 14, where the computer readable program code when executed on the computer further causes the computer to at least one of:

if the occurrence count of a first respective middle substring is significantly less than the occurrence count of another middle substring being compared with the first respective middle substring, consider the first respective middle substring as being a specialized concept of the other middle substring; and if the occurrence count of the first respective middle substring is significantly greater than the occurrence count of another middle substring being compared with the first respective middle substring, consider the first respective middle substring as being a generalized concept of the other middle substring.

16. The computer program product of claim 10, where the computer readable program code when executed on the computer further causes the computer to replace one or more occurrences of the concepts in the tuples with a most frequently occurring concept yielding an altered string pattern.

17. The computer program product of claim 16, where the computer readable program code when executed on the computer further causes the computer to, in the altered string pattern:

set the reference string set comprising the plurality of strings;
denote each string with its occurrence count;
find, inside the reference string set comprising the plurality of strings, specific substring triples of substring tuples of the at least two specific tuples;
consider each tuple as the candidate for representing the related concept;
where:
each prefix substring of the substring triples and each suffix substring of the substring triples is an explicit member of the reference string set;
each concatenation of the substrings triples is an explicit member of the reference string set;
each middle substring of the substring triples is unequal to another middle substring within the substring triples found inside the reference string set; and
either the prefix substring of the substring triples or the suffix substring of the substring triples is not empty.

18. A data processing system for string pattern conceptualization, particularly for a pattern of words, comprising:
a memory element adapted to store strings; and
a processor programmed to:
set a reference string set comprising a plurality of strings;
find, inside the reference string set comprising the plurality of strings, at least two specific tuples of substring triples that each comprise a prefix substring, a middle substring, and a suffix substring; and
consider each tuple as a candidate for representing a related concept;
where:
each concatenation of the substring triples is an explicit member of the reference string set;
each middle substring of the substring triples is unequal to another middle substring within the substring triples found inside the reference string set;
each prefix substring of the substring triples is equal to all other prefix substrings within the substring triples found inside the reference string set;
each suffix substring of the substring triples is equal to all other suffix substrings within the substring triples found inside the reference string set; and
either the prefix substring of the substring triples or the suffix substring of the substring triples is not empty.

19. The data processing system of claim 18, where the processor is further programmed to rank the candidate tuples according to attributes of at least one of the prefix substring of the substring triples and the suffix substring of the substring triples.

20. The data processing system of claim 18, where the processor is further programmed to filter a result of one or more tuples of substrings found as candidates for representing the related concept considering specific types of a desired result.

21. The data processing system of claim 20, where, in begin programmed to filter the result of the one or more tuples of substrings found as the candidates for representing the related concept considering the specific types of the desired result, the processor is programmed to at least one of:

use a minimum length for the middle substrings;
use a maximum length for the middle substrings;

use a minimum length for at least one of the prefix substrings and the suffix substrings;
request that the prefix substring ends with a particular regular expression;
request that the suffix substring starts with a particular regular expression; and
request that at least one of the middle substrings has a certain string value.

22. The data processing system of claim 18, where the processor is further programmed to compare at least two occurrence counts if at least one of two or more of the middle substrings and two or more concatenations of the prefix substrings and the middle substrings are explicit members of the reference string set.

23. The data processing system of claim 22, where the processor is further programmed to at least one of:
if the occurrence count of a first respective middle substring is significantly less than the occurrence count of another middle substring being compared with the first respective middle substring, consider the first respective middle substring as being a specialized concept of the other middle substring; and
if the occurrence count of the first respective middle substring is significantly greater than the occurrence count of another middle substring being compared with the first respective middle substring, consider the first respective middle substring as being a generalized concept of the other middle substring.

24. The data processing system of claim 18, where the processor is further programmed to replace one or more occurrences of the concepts in the string pattern with a most frequently occurring concept yielding an altered string pattern.

25. The data processing system of claim 24, where the processor is further programmed to, in the altered string pattern:
set the reference string set comprising the plurality of strings;
denote each string with its occurrence count;
find, inside the reference string set comprising the plurality of strings, specific substring triples of substring tuples of the at least two specific tuples;
consider each tuple as the candidate for representing the related concept;
where:
each prefix substring of the substring triples and each suffix substring of the substring triples is an explicit member of the reference string set;
each concatenation of the substrings triples is an explicit member of the reference string set;
each middle substring of the substring triples is unequal to another middle substring within the substring triples found inside the reference string set; and
either the prefix substring of the substring triples or the suffix substring of the substring triples is not empty.

* * * * *